United States Patent [19]

Hunziker et al.

[11] 3,717,637
[45] Feb. 20, 1973

[54] TRIFLUOROMETHYLTHIO SUBSTITUTED DIBENZ [b,f] [1,4] OXAZEPINES

[75] Inventors: Fritz Hunziker, Bern; Jean Schmutz, Muri near Bern; Franz Martin Kunzle, Bern, all of Switzerland

[73] Assignee: Sandoz-Wander, Inc., Hannover, N.J.

[22] Filed: July 28, 1970

[21] Appl. No.: 58,984

[30] Foreign Application Priority Data

Aug. 6, 1969   Switzerland..........................11925/69
Aug. 20, 1969  Switzerland..........................12595/69
Oct. 11, 1969  Switzerland..........................15039/69
June 11, 1970  Switzerland............................8699/70

[52] U.S. Cl. ......260/268 TR, 260/239 R, 260/268 C, 260/562 A, 260/578, 260/645, 424/258
[51] Int. Cl. ...........................................C07d 51/70
[58] Field of Search................................260/268 TR

[56] References Cited

UNITED STATES PATENTS

| | | | |
|---|---|---|---|
| 2,889,322 | 6/1959 | Jacob et al. | 260/268 TR |
| 2,919,272 | 12/1959 | Craig | 260/268 TR |
| 3,322,789 | 5/1967 | Kreighbaum | 260/268 TR |
| 3,546,226 | 12/1970 | Schmutz et al. | 260/268 TR |
| 3,458,516 | 7/1969 | Howell | 260/268 TR |
| 3,539,573 | 11/1970 | Schmutz et al. | 260/268 TR |

*Primary Examiner*—Donald G. Daus
*Attorney*—Gerald D. Sharkin, Robert S. Honor, Frederick H. Weinfeldt, Richard E. Vila and Walter F. Jewell

[57] ABSTRACT

The present invention concerns new compounds of the formula:

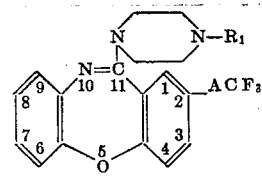

wherein A is sulphur or a sulphonyl group,
   $R_1$ is hydrogen, alkyl of one to three carbon atoms, hydroxyalkyl of one to three carbon atoms, acetoxyalkyl, wherein the alkyl is of one to three carbon atoms, or alkoxyalkyl with a total of at most six carbon atoms,
and acid addition salts thereof. The compounds are neuroleptics and antiemetics.

13 Claims, No Drawings

TRIFLUOROMETHYLTHIO SUBSTITUTED DIBENZ [b,f] [1,4] OXAZEPINES

IMPROVEMENTS IN OR RELATING TO ORGANIC COMPOUNDS

The present invention relates to compounds of formula I,

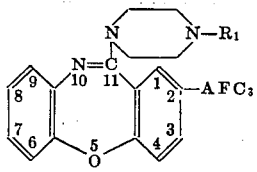

I wherein A is sulphur or a sulphonyl group,
$R_1$ is hydrogen, alkyl or one to three carbon atoms, hydroxyalkyl of one to three carbon atoms, acetoxyalkyl, wherein the alkyl is of one to three carbon atoms, or alkoxyalkyl with a total of at most six carbon atoms,
and acid addition salts thereof, as well as to processes for their production.

In accordance with the invention
a. compounds of formula I may be obtained either by
1. reacting a compound of formula II,

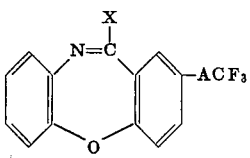

II wherein A is as defined above, and
X is a reactive group capable of being split off with the hydrogen on the nitrogen atom of a piperazine, with a compound of formula III,

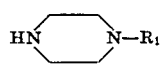

III wherein $R_1$ is as defined above, or
2. subjecting a compound of formula IV,

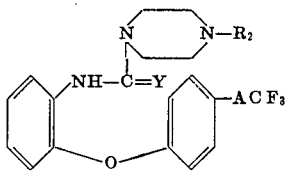

IV wherein A is as defined above,
Y is oxygen or sulphur, and $R_2$ is hydrogen or a protective radical, alkyl of one to three carbon atoms, hydroxyalkyl of one to three carbon atoms, acetoxyalkyl, wherein the alkyl is of one to three carbon atoms, or alkoxyalkyl with a total of at most six carbon atoms,
to ring closure by heating in the presence of a condensation agent, and where the resulting compound contains a protective radical, this is split off, or
3. subjecting a compound of formula V,

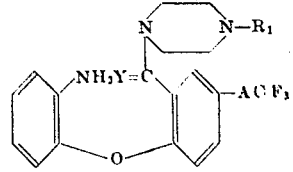

V wherein A, $R_1$ and Y are as defined above, to ring closure by heating, or
4. reacting a compound of formula VI,

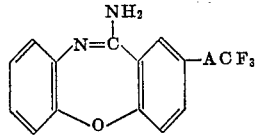

VI wherein A is as defined above,
with a reactive ester of a compound of formula VII,

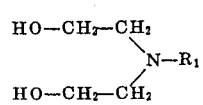

VII wherein $R_1$ is as defined above, or
5. reacting a compound of formula VIII,

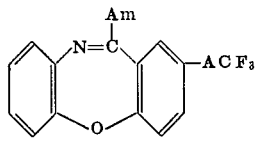

VIII wherein A is as defined above, and
Am is amino, monoalkylamino or dialkylamino, with a compound of the above formula III, or
b. a compound of formula Ia,

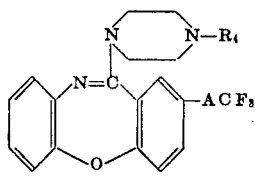

Ia wherein A is as defined above, and
$R_4$ is alkyl of one to three carbon atoms, hydroxyalkyl of one to three carbon atoms, acetoxyalkyl, wherein the alkyl is of one to three carbon atoms, or alkoxyalkyl with a total of at most six carbon atoms,
is obtained by alkylating, hydroxyalkylating or alkoxyalkylating a compound of formula Ib,

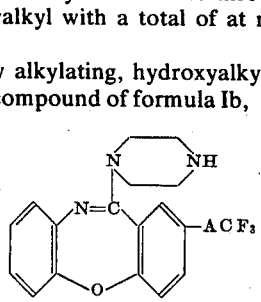

Ib wherein A is as defined above,
and where a compound in which $R_4$ is acetoxyalkyl is required, the resulting compound wherein $R_4$ is hydroxyalkyl is acetylated.

The compounds of formula I are basic and may be converted into acid addition salts in conventional manner by treatment with an inorganic or organic acid.

The process indicated in section a)1) may be effected as described below:

The reactive group in the compounds of formula II, which may be a halogen atom, especially chlorine, the sulfhydryl group, an alkoxy or alkylthio group of one to five carbon atoms, e.g., the methoxy or methylthio group, an aralkylthio group which may optionally be activated by substituents, e.g., the p-nitrobenzylthio group or a tosyl group, is reacted with a compound of formula III, conveniently in an inert organic solvent, e.g., xylene or dioxane, at a temperature between 50° and 170° C. The reaction time ranges between about 2 and 20 hours. The reaction is preferably effected by maintaining the reaction mixture at the boil for 4 to 6 hours. It is not essential that the compound of formula II be used in isolated form for the reaction in accordance with the invention.

The process indicated in section a) 2) may be effected as described below:

Compounds of formula IV are subjected to ring closure by heating for 1 to 46 hours to a temperature between 50° and 150° C in the presence of a condensation agent, e.g., zinc chloride, aluminum chloride, tin tetrachloride, polyphosphoric acid, phosphorus pentasulphide, phosphorus oxychloride or phosphorus pentoxide. When $R_2$ in the compounds of formula IV denotes a protective radical, this may conveniently be a group capable of being split off hydrolytically or hydrogenolytically, e.g. a carbalkoxy group, especially the carbethoxy group or the carbobenzoxy group. Ring closure may be effected in a liquid reaction medium without an additional solvent; when no liquid reaction medium is used it is convenient to use an inert organic solvent such as benzene, xylene or toluene. A preferred method of effecting this process consists in that a compound of formula IV is heated to the boil for 24 hours, in the presence of phosphorus oxychloride or in the presence of phosphorus oxychloride and phosphorus pentoxide.

In accordance with the chosen reaction conditions, a compound of formula IV wherein $R_2$ is a protective radical capable of being split off hydrolytically, e.g. the carbethoxy group, is cyclized directly to the 11-(1-piperazinyl) compound with simultaneous removal of this group. Other $R_2$ groups capable of being split off, e.g. the carbobenzoxy group, are removed in known manner, e.g., hydrogenolytically, after ring closure.

The process indicated in section a) 3) may be effected as described below:

A compound of formula V is heated to a temperature between 50° and 150° C for 1 to 12 hours, preferably in the presence of a condensation agent such as phosphorus pentachloride, phosphorus oxychloride, phosgene or polyphosphoric acid, and is thus subjected to ring closure. For the ring closure of the thioamides it is also possible to use mercury salts in place of the condensation agents indicated above; however, ring closure of the thioamides may likewise be effected by heating without condensation agents. The acid amides are preferably subjected to ring closure in the presence of phosphorus oxychloride or phosphorus pentachloride, as well as catalytic amounts of dimethyl formamide or dimethyl aniline, by heating to the boiling temperature of the reaction mixture. Under the reaction conditions indicated above, ring closure may also be effected in the presence of a suitable inert organic solvent, e.g. dioxane, toluene or xylene.

The process indicated in section a) 4) may be effected as described below:

The reaction of compounds of formula VI with reactive esters of compounds of formula VII, whereby suitable reactive esters are those of inorganic or organic acids, e.g. of hydrohalic acids, sulphonic acids or carbonic acid, may be conveniently effected after the previous or with the simultaneous action of a basic catalyst or metallization agent such as sodium amide, lithium amide, sodium hydride, butyl lithium, phenyl sodium, sodium ethylate or potassium tert.butylate, by heating to a temperature between 60° and 120° C, preferably 80° C, in an inert organic solvent such as dimethyl sulphoxide, dioxane or dimethyl formamide.

The process indicated in section a) 5) may be effected as described below:

A compound of formula VIII is reacted with a compound of formula III, preferably using an excess of the latter compound, conveniently in the presence of catalytic amounts of an acid, e.g. p-toluenesulphonic or sulphuric acid, or the corresponding acid addition salt of a compound of formula VIII, by heating to a temperature between 70° and 220° C, preferably to a temperature between 125° and 175° C, for 2 to 48 hours. However, the reaction is advantageously effected by heating the liquid reaction mixture, in which the compound of formula III simultaneously serves as solvent, to the boil. However, the reaction may likewise be effected in the presence of an inert organic solvent having a suitable boiling point, e.g. a lower alcohol such as ethanol or butanol, or an ether such as diethylene glycol monoethyl ether.

The process indicated in section b) may be effected as described below:

Alkylation of a compound of formula Ib may be effected either by reaction with a reactive ester of an appropriate alkanol, or by the so-called reductive alkylation, i.e., by reaction with the corresponding aldehyde in the presence of catalytically activated hydrogen, or in the presence of a reducing agent, e.g. formic acid.

For the reaction with the reactive ester of a corresponding alkanol, the compound of formula Ib is preferably dissolved in an inert organic solvent, an acid-binding agent such as potassium carbonate and the reactive ester of an appropriate alkanol is added to the resulting solution, and the resulting reaction mixture is maintained at a temperature between room temperature (about 25° C) and the boiling temperature of the reaction mixture for 1 to 4 hours. The esters of alkanols with organic or inorganic acids, e.g. toluenesulphonic acid, or of hydrohalic acids, may be used as reactive esters for this reaction. An excess of the compound of formula Ib may be used in place of an acid-binding agent. Examples of inert organic solvents are acetone and isopropanol.

The reductive alkylation of compounds of formula Ib may, for example, be effected by dissolving a compound of formula Ib in 90 percent formic acid, adding the corresponding aldehyde to the resulting solution and heating the resulting reaction mixture to a temperature between 50° and 150° C, preferably, however, to the boiling temperature of the reaction mixture, for 5 to 20 hours.

Hydroxyalkylation of compounds of formula Ib may be effected using the process described for alkylation, by reaction of a compound of formula Ib with a monoester of the corresponding glycol. A further method consists in that a compound of formula Ib in an inert organic solvent such as toluene, is treated with a suitable alkylene oxide, whereby this reaction is conveniently effected in a pressure tube by heating to a temperature between 80° and 120° C for 3 to 7 hours.

Alkoxyalkylation of a compound of formula Ib may be effected using the process described for alkylation, by reaction of a compound of formula Ib with a reactive ester of an alkoxy alcohol.

The compounds of formula I, wherein $R_1$ signifies the hydroxyalkyl group, obtained in accordance with one of the processes described above, may be acetylated by treatment with a reactive derivative of acetic acid, e.g., acetic anhydride, in a basic organic solvent such as pyridine.

The compounds of formula I obtained in accordance with the invention may be isolated in known manner, e.g. by precipitating from the reaction mixture, concentrating the reaction mixture by evaporation, salt formation, etc., and may be purified in known manner, e.g. by recrystallization. The resulting compounds of formula I may be converted into acid addition salts in known manner.

The compounds of formula II, wherein X signifies halogen, alkoxy, sulfhydryl or alkylmercapto, used as starting materials in the process of section a) 1), may be obtained by treating a compound of formula IX,

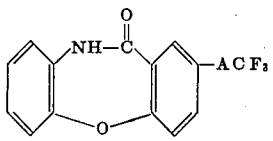

IX wherein A is as defined above,
in known manner with a halogenating agent, e.g., a chlorinating agent such as phosphorus oxychloride or phosphorus pentachloride, preferably in the presence of catalytic amounts of dimethyl aniline or dimethyl formamide, or by treating a compound of formula II, wherein X is halogen, with an alkali metal alcoholate, or by converting a compound of formula IX in known manner into a thiolactam, i.e., into a compound of formula II, wherein Y is sulfhydryl, and alkylating these compounds in known manner.

Those compounds of formula II, wherein X signifies other than a halogen, alkoxy, sulfhydryl or alkylmercapto group, may be produced in accordance with known processes.

The compound of formula IX, wherein A is sulphur, used as starting material in the above process, may, for example, be obtained by subjecting the compound of formula X

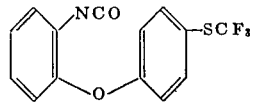

X to ring closure in known manner, in the presence of phosphorus oxychloride and phosphorus pentoxide.

The compound of formula IX, wherein A is the sulphonyl group, may be obtained by oxidizing the compound of formula IX, wherein A is sulphur, in known manner, e.g., with hydrogen peroxide.

The compound of formula X, used as starting material in the above process, may, for example, be obtained by treating the compound of formula XI

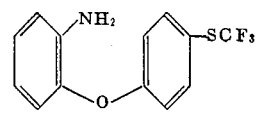

XI with phosgene. The compound of formula XI is obtained by reduction of the corresponding nitro compound of formula XII.

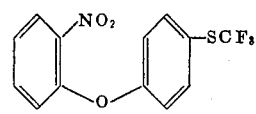

XII

The compound of formula XII is obtained by treating the compound of formula XIII

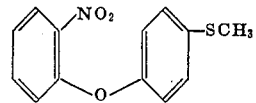

XIII with chlorine and reacting the resulting compound of formula XIV

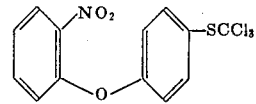

XIV with antimony trifluoride.

The compounds of formula IV, used as starting materials in the process of section a) 2), may be obtained by reacting a compound of formula XV,

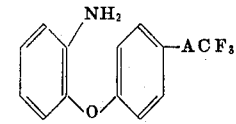

XV wherein A is sulphur or a sulphonyl radical,
with phosgene or thiophosgene in known manner, and reacting the resulting isocyanate or isothiocyanate with a compound of formula III.

The compound of formula XV, wherein A is sulphur, corresponds to the compound of formula XI and may be produced in analogous manner. The compound of formula XV, wherein A is the sulphonyl group, may be obtained by oxidizing the compound of formula XII, e.g. with hydrogen peroxide, and reducing the nitro group in the resulting compound to the amino group in known manner.

The compounds of formula V, wherein Y is oxygen, used as starting materials in the process of section a) 3), may, for example, be obtained by reducing a compound of formula XVI,

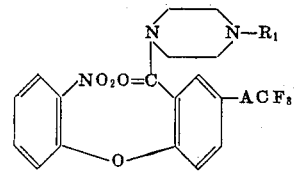

XVI wherein A is sulphur or a sulphonyl radical, and

R₁ is as defined above, in known manner. A compound of formula XVI may, for example, be obtained by chlorinating a compound of formula XVII,

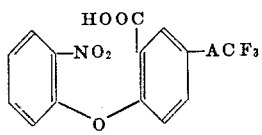

XVII wherein A is as defined above,
e.g. by the action of thionyl chloride, and subsequently reacting the resulting acid chloride with a compound of formula III.

The compounds of formula XVII, used as starting materials in the above process, may, for example, be obtained as follows:

The compound of formula XVIII

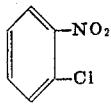

XVIII is reacted in known manner with the compound of formula XIX.

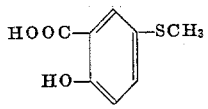

XIX

The resulting compound of formula XX

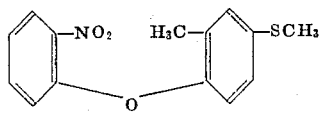

XX is chlorinated to give the compound of formula XXI.

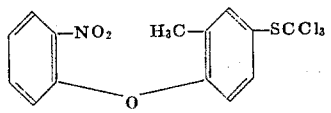

XXI

This is treated with antimony fluoride, whereby the compound of formula XXII

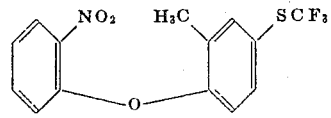

XXII is obtained; this is photobrominated in known manner, whereby the compound of formula XXIII

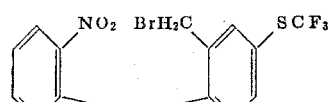

XXIII is obtained. The compound of formula XXIII is subjected to mild oxidation, whereby the compound of formula XVII, wherein A is sulphur, is obtained. The compound of formula XVII, wherein A is the sulphonyl group, is produced by oxidizing the compound of formula XVII, wherein A is sulphur, in known manner, e.g. with hydrogen peroxide.

The compounds of formula V, wherein Y is sulphur, used as starting material in the process of section a) 3), may be obtained by reacting compounds of formula XVI in known manner with phosphorus pentasulphide and reducing the nitro group in the resulting compounds to the amino group.

The starting compounds of formulas VI and VIII, used in the processes of section a), 4) and 5), may, for example, be obtained by reacting a compound of formula II with ammonia or a lower mono- or dialkyl amine.

The compounds of formula Ib, used as starting materials in the process of section b), form part of the compounds of formula I and may be produced in accordance with one of the processes described for these compounds.

The processes used for the production of the starting compounds described above are known and may be produced in accordance with known procedures.

The compounds of formula I, obtained in accordance with the invention, are basic, sometimes crystalline compounds which are solid at room temperature and which may be converted into acid addition salts by reaction with suitable inorganic or organic acids. Suitable organic acids for salt formation are, e.g., toluenesulphonic, malonic, succinic, malic, maleic or tartaric acid, and suitable inorganic acids are, e.g., hydrohalic acids, sulphuric, nitric or phosphoric acid.

The compounds of formula I and pharmaceutically acceptable acid addition salts thereof are useful because they possess pharmacological activity in animals. More particularly, the compounds are useful neuroleptics and antiemetics as indicated by the catalepsy test and the apomorphine antagonism test [method of Janssen et al., Arzneimittelforschung 10, 1003 (1960)] in rats. Each of the tests indicate neuroleptic activity, and the apomorphine antagonism test further indicates antiemetic activity.

The dosage administered will, of course, vary depending on the compound employed, the mode of administration and the treatment desired. However, dosages are similar for use as both neuroleptics and antiemetics, and satisfactory results are obtained when administered at a daily dosage of from about 0.01 to about 10 milligrams per kilogram of animal body weight, conveniently given in divided doses two to three times a day or in sustained release form. For the larger mammals, the total daily dosage is in the range of from about 1 milligram, preferably 5 milligrams, to about 60 milligrams.

Dosage forms suitable for oral administration contain between 2.5 and 60 milligrams of active agent, in association with a pharmaceutical carrier or diluent.

In the following non-limitative Examples all temperatures are indicated in degrees Centigrade.

EXAMPLE 1: 2-Trifluoromethylthio-11-(4-methyl-1-piperazinyl)-dibenz[b,f] [1,4]oxazepine.

A solution of 6 g of 2-(4-methyl-1-piperazinyl-carbonyl-amino)-4'-trifluoromethylthio-diphenyl oxide in 20 cc of methanol is acidified with 2 N hydrochloric acid in alcohol and is evaporated to dryness in a vacuum. The dihydrochloride obtained as residue is heated to the boil at reflux for 24 hours with 60 cc of phosphorus oxychloride and 6 g of phosphorus pentoxide. The reaction mixture is concentrated by evaporation in a vacuum, ice/water is added to the resulting viscous residue and shaking out is effected with ether. The aqueous acid phase is made alkaline with a concentrated caustic soda solution and the precipitated base is shaken out with ether. The ether extracts are washed with water, dried over sodium sulphate and evaporated to dryness. The ether residue is dissolved in methanol and two equivalents of maleic acid are added. After the addition of ether, 2-trifluoro-methylthio-11-(4-methyl-1-piperazinyl)-dibenz[b,f] [1,4]oxazepine maleate is obtained in the form of colorless crystals having a M.P. of 173°–177°. The base liberated from the maleate has a M.P. of 121°–122°.

The 2-(4-methyl-1-piperazinyl-carbonylamino)-4'-trifluoro-methylthio-diphenyl oxide, used as starting material in this Example, may be obtained as follows:

52.2 g of 2-nitro-4'-methylthio-diphenyl oxide are dissolved in 1.5 liters of chloroform and chlorination is effected at 20° while exposing to light and passing a total of 43 g of chlorine gas through the solution. The reaction mixture is concentrated by evaporation in a vacuum and the resulting residue is crystallized from ether/petroleum ether, whereby 2-nitro-4'-trichloromethylthiodiphenyl oxide, having a M.P. of 76°–79, is obtained.

61.3 g of 2-nitro-4'-trichloromethylthio-diphenyl oxide are dissolved in 280 cc of tetramethylene sulphone and heated to 150° within 30 minutes with 41 g of antimony trifluoride. The reaction mixture is then kept at this temperature for 1 ½ hours, water and concentrated hydrochloric acid are added until the resulting precipitate again dissolves, and shaking out is effected with ether. The organic phase is washed with 5 N hydrochloric acid and 2 N aqueous sodium hydroxide solution, is dried over sodium sulphate and evaporated to dryness in a vacuum. 2-Nitro-4'-trifluoromethylthio-diphenyl oxide, having a B.P. of 125°–130°/0.1 mm of Hg, is obtained as residue and may be crystallized from ether/petroleum ether in the form of yellowish crystals having a M.P. of 40°–42°.

27.8 g of 2-nitro-4'-trifluoromethylthio-diphenyl oxide are hydrogenated in ethyl acetate in the presence of Raney nickel at normal pressure and 20°. 2-Amino-4'-trifluoromethylthio-diphenyl oxide is obtained as colorless oil having a B.P. of 110°–114°/0.05 mm of Hg.

26 g of 2-amino-4'-trifluoromethylthio-diphenyl oxide are added dropwise while stirring to 150 cc of an approximately 20 percent solution of phosgene in absolute toluene. The reaction mixture is subsequently heated to the boil at reflux for 15 minutes while phosgene is passed through. After removing the toluene by distillation, the residue is fractionated in a vacuum. 2-Isocianato-4'-trifluoro-methylthio-diphenyl oxide is obtained as colorless oil having a B.P. of 110°–115°/0.07 mm of Hg.

8.5 g of 2-isocyanato-4'-trifluoromethylthio-diphenyl oxide are dissolved in 100 cc of benzene and 10 cc of N-methyl piperazine are added portionwise. After the exothermic reaction subsides, heating at reflux is effected for 15 minutes. The reaction mixture is subsequently washed several times with water, dried over sodium sulphate and evaporated to dryness in a vacuum. The residue is crystallized from acetone/petroleum ether, whereby 2-(4-methyl-1-piperazinyl-carbonylamino)-4'-trifluoromethylthio-diphenyl oxide is obtained in the form of colorless needles having a M.P. of 125°–126°.

Example 2: 2-Trifluoromethylthio-11-(4-methyl-1-piperazinyl)-dibenz[b,f] [1,4]oxazepine.

10 g of 2-trifluoromethylthio-10,11-dihydro-11-oxo-dibenz[b,f] [1,4]oxazepine are heated to the boil at reflux for 5 hours in 100 cc of phosphorus oxychloride and 3 cc of N,N-dimethyl aniline. After removing the excess phosphorus oxychloride by distillation in a vacuum, the residue is dissolved in xylene and shaken out with 2N hydrochloric acid and water. The organic phase which has been dried over sodium sulphate is heated to the boil at reflux for 6 hours with 18 cc of N-methyl piperazine. After cooling the reaction mixture is washed with water and exhaustively shaken out with 2 N hydrochloric acid. The acid phase is made alkaline with a concentrated ammonia solution and the precipitated base is shaken out with ether. The ether phase is washed with water, dried over sodium sulphate and concentrated by evaporation in a vacuum. The residue is crystallized from petroleum ether, whereby 2-trifluoromethylthio-11-(4-methyl-1-piperazinyl)-dibenz[b,f] [1,4]oxazepine is obtained in the form of pale yellow prisms having a M.P. of 121°–122°, this compound being identical with the product obtained in accordance with Example 1.

The 2-trifluoromethylthio-10,11-dihydro-11-oxo-dibenz[b,f] [1,4]oxazepine, used as starting material in this Example, is obtained as follows:

3 g of 2-isocyanate-4'-trifluoromethylthio-diphenyl oxide are heated to the boil at reflux for 24 hours with 40 cc of phosphorus oxychloride and 4 g of phosphorus pentoxide. The reaction mixture is concentrated by evaporation in a vacuum, ice is added to the resulting viscous residue while cooling, the reaction mixture is made almost neutral (pH≈6) with a concentrated caustic soda solution, is allowed to stand for 24 hours and shaken out with ether. The ether phase is washed with water and aqueous sodium chloride solution, dried over sodium sulphate and strongly concentrated by evaporation. After the addition of petroleum ether, 2-trifluoromethylthio-10,11-dihydro-11-oxo-dibenz[b,f] [1,4]oxazepine is obtained in the form of crystals having a M.P. of 215°–216°.

Example 3: 2-Trifluoromethylthio-11-(4β-hydroxyethyl-1-piperazinyl)-dibenz[b,f] [1,4]oxazepine.

4 g of 2-trifluoromethylthio-10,11-dihydro-11-oxo-dibenz[b,f] [1,4]oxazepine are heated to the boil at reflux for three hours with 100 cc of phosphorus oxychloride and 0.5 cc of N,N-dimethyl aniline. After removing the excess phosphorus oxychloride by distillation in a vacuum, the residue is dissolved in 100 cc of xylene and the solution is poured on ice. The xylene phase is washed with 2 N hydrochloric acid and water, dried over sodium sulphate and concentrated in a vacuum to about 80 cc. 10 cc of N-(β-hydroxyethyl)-piperazine are subsequently added and the reaction mixture is heated to the boil at reflux for 5 hours. The reaction mixture is shaken out with a 2 N aqueous sodium hydroxide solution and is then exhaustively extracted with 2 N hydrochloric acid. The acid extracts are made alkaline with a concentrated caustic soda solution and the precipitated base is shaken out with ether. The ether phase is washed with water, dried over sodium sulphate and filtered. The filtrate is concentrated by evaporation in a vacuum. The residue is crystallized from petroleum ether, whereby 2-trifluoromethylthio-11-(4β-hydroxy-ethyl-1-piperazinyl)-dibenz[b,f] [1,4]oxazepine is obtained in the form of crystals having a M.P. of 121°–123°.

Example 4: 2-Trifluoromethylthio-11-(1-piperazinyl)-dibenz[b,f] [1,4]oxazepine.

2-Trifluoromethylthio-11-(1-piperazinyl)-dibenz[b,f] [1,4]-oxazepine is obtained after crystallization from ether/petroleum ether in the form of slightly yellowish prisms having a M.P. of 104°–107°, by a process analogous to that described in Example 3, but using 15 cc of piperazine in place of 10 cc of N-(β-hydroxyethyl)-piperazine.

Example 5: 2-Trifluoromethylsulphonyl-11-(4-methyl-1-piperazinyl)-dibenz[b,f] [1,4]oxazepine.

2.3 g of 2-trifluoromethylsulphonyl-10,11-dihydro-11-oxo-dibenz[b,f] [1,4]oxazepine are heated to the boil at reflux for 4 ½ hours with 40 cc of phosphorus oxychloride and 1 cc of N,N-dimethyl aniline. The reaction mixture is concentrated by evaporation in a vacuum, the resulting residue is dissolved in 100 cc of xylene and the solution is poured on ice/water. The organic phase is washed with 2 N hydrochloric acid and water and is dried over sodium sulphate. After concentrating the filtrate by evaporation in a vacuum, 4 cc of N-methyl piperazine are added and the reaction mixture is heated to the boil at reflux for 5 hours. After cooling, the reaction mixture is washed with 2 N aqueous sodium hydroxide solution and water and is shaken out with 2 N hydrochloric acid. The acid extracts are made alkaline with a concentrated caustic soda solution and are extracted with ether. The ether phase is washed with water, dried over sodium sulphate and concentrated by evaporation. The residue is dissolved in acetone and 0.9 g of oxalic acid are added. After the addition of ether, 2-trifluoromethylsulphonyl-11-(4-methyl-1-piperazinyl)-dibenz[b,f] [1,4]oxazepine oxalate crystallizes in the form of slightly yellowish, prismatic crystals having a M.P. of 223°–226°. The resulting oxalate is suspended in water, is made alkaline with a 2 N aqueous sodium hydroxide solution and the precipitated base is extracted with ether. The ether phase is concentrated by evaporation and the residue is crystallized from ether/petroleum ether whereby 2-trifluoromethylsulphonyl-11-(4-methyl-1-piperazinyl)-dibenz[b,f] [1,4]oxazepine is obtained in the form of yellow crystals having a M.P. of 120°–121°.

The 2-trifluoromethylsulphonyl-10,11-dihydro-11-oxo-dibenz[b,f] [1,4]oxazepine, used as starting material in this Example, is obtained as follows:

2.5 g of 2-trifluoromethylthio-10,11-dihydro-11-oxo-dibenz[b,f] [1,4]oxazepine are suspended in 50 cc of glacial acetic acid and 4 cc of a 30 percent peroxide solution are added. The reaction mixture is heated to 70° for 1 hour and subsequently to 100°–110° for 1 ½ hours. Water is subsequently added to the reaction mixture and this is concentrated by evaporation in a vacuum. The resulting mash is drawn off by suction and taken up in ether. The ether phase is washed with water, a 2N aqueous sodium hydroxide solution and an aqueous sodium chloride solution, is dried over sodium sulphate, treated with active charcoal and filtered through a small amount of aluminum oxide. The filtrate is concentrated by evaporation and petroleum ether is added. The precipitated crystals are separated and recrystallized from acetone/petroleum ether. 2-Trifluoromethylsulphonyl-10,11-dihydro-11-oxo-dibenz[b,f] [1,4]oxazepine, having a M.P. of 193°–198°, is obtained.

Example 6: 2-Trifluoromethylsulphonyl-11-(1-piperazinyl)-dibenz[b,f] [1,4]oxazepine.

4.5 g of 2-trifluoromethylsulphonyl-10,11-dihydro-11-oxo-dibenz[b,f] [1,4]oxazepine are heated to the boil at reflux for 4 ½ hours with 70 cc of phosphorus oxychloride and 1.5 cc of N,N-dimethyl aniline. After removing the excess phosphorus oxychloride by distillation in a vacuum, the residue is dissolved in 120 cc of xylene and is poured on ice/water. The xylene phase is washed with 2 N hydrochloric acid and with water, is dried over sodium sulphate and concentrated in a vacuum to 100 cc. 20 cc of anhydrous piperazine are subsequently added and the reaction mixture is heated to the boil at reflux for 5 hours. The reaction mixture is subsequently washed with a 2 N aqueous sodium hydroxide solution and with water and is then exhaustively extracted with 2 N hydrochloric acid. The acid extracts are made alkaline with a concentrated caustic soda solution and the precipitated base is shaken out with ether. The ether phase is washed with water, dried over sodium sulphate and filtered. The filtrate is concentrated by evaporation, the residue is dissolved in acetone and 1.15 g of maleic acid are added. After the addition of ether, 2-trifluoromethylsulphonyl-11-(1-piperazinyl)-dibenz[b,f] [1,4]-oxazepine maleate is obtained in the form of colorless prisms having a M.P. of 183°–186°.

Example 7: 2-Trifluoromethylsulphonyl-11-(4β-hydroxyethyl-1-piperazinyl)-dibenz[b,f] [1,4]oxazepine.

2-Trifluoromethylsulphonyl-11-(4β-hydroxyethyl-1-piperazinyl)-dibenz[b,f] [1,4]oxazepine is obtained after crystallization from ether/petroleum ether in the form of prisms having a M.P. of 121°–123°, by a process analogous to that described in Example 6, but using 2 cc. of N,N-dimethyl aniline and 100 cc of phosphorus oxychloride as well as 12 g of N-(β-hydroxyethyl)-piperazine in place of 20 cc of piperazine.

Example 8: 2-Trifluoromethylsulphonyl-11-(4γ-hydroxypropyl-1-piperazinyl)-dibenz[b,f] [1,4]oxazepine.

3.4 g of 2-trifluoromethylsulphonyl-10,11-dihydro-11-oxo-dibenz[b,f] [1,4]oxazepine are heated to the boil at reflux for 4 1/2 hours with 50 cc of phosphorus oxychloride and 1 cc of N,N-dimethyl aniline. After removing the excess phosphorus oxychloride by distillation in a vacuum, the residue is distilled in 100 cc of xylene and poured on ice. The xylene phase is washed with 2 N hydrochloric acid and water, is dried over sodium sulphate and concentrated in a vacuum to about 80 cc. 2.9 g of N-(γ-hydroxy-propyl)-piperazine are subsequently added and the resulting reaction mixture is heated to the boil at reflux for 5 hours. After the addition of water and a concentrated caustic soda solution, extraction is effected with ether. The organic phase is washed with water and is then exhaustively extracted with 2 N hydrochloric acid. The acid extracts are made alkaline with a concentrated caustic soda solution and the precipitated base is shaken out with ether. The ether phase is washed with water, dried over sodium sulphate and concentrated by evaporation in a vacuum. After the addition of petroleum ether, crystals are obtained which are separated and recrystallized first from acetone and then from ether/petroleum ether. 2-Trifluoromethyl-sulphonyl-11-(4γ-hydroxypropyl-1-piperazinyl)-dibenz[b,f] [1,4]-oxazepine is obtained in the form of slightly yellowish crystals having a M.P. of 150°–151°.

Example 9: 2-Trifluoromethylsulphonyl-11-(4β-hydroxypropyl-1-piperazinyl)-dibenz[b,f] [1,4]oxazepine.

3.4 g of 2-trifluoromethylsulphonyl-10,11-dihydro-11-oxo-dibenz[b,f] [1,4]oxazepine are heated to the boil at reflux for 4 ½ hours with 50 cc of phosphorus oxychloride and 0.5 cc of N,N-dimethyl aniline. After removing the excess phosphorus oxychloride by distillation in a vacuum, the residue is distilled in 100 cc of xylene and is poured on ice. The xylene phase is washed with 2 N hydrochloric acid and water, is dried over sodium sulphate and concentrated in a vacuum to about 80 cc. 2.9 g of N-(β-hydroxy-propyl)-piperazine are subsequently added and the resulting reaction mixture is heated to the boil at reflux for 4 ½ hours. Water and a concentrated caustic soda solution are added to the reaction mixture and extraction is then effected with ether. The xylene/ether phase is washed with water and is then exhaustively extracted with 2 N hydrochloric acid. The acid extracts are made alkaline with a concentrated caustic soda solution and the precipitated base is shaken out with ether. The ether phase is washed with water, dried over sodium sulphate and concentrated by evaporation. After the addition of petroleum ether, crystals are obtained, which are filtered off and recrystallized from ether/petroleum ether. 2-Trifluoromethyl-sulphonyl-11-(4β-hydroxypropyl-1-piperazinyl)-dibenz[b,f] [1,4]-oxazepine is obtained in the form of yellow prismatic crystals having a M.P. of 132°–134°.

Example 10: 2-Trifluoromethylsulphonyl-11-(4-ethyl-1-piperazinyl)-dibenz[b,f] [1,4]oxazepine.

2 g of 2-trifluoromethylsulphonyl-10,11-dihydro-11-oxo-dibenz[b,f] [1,4]oxazepine are boiled at reflux for 4 ½ hours with 25 cc of phosphorus oxychloride and 0.5 cc of N,N-dimethyl aniline. After removing the excess phosphorus oxychloride by distillation in a vacuum, the residue is dissolved in 100 cc of xylene and is poured on ice. The xylene phase is washed with 2 N hydrochloric acid and water, is dried over sodium sulphate and concentrated in a vacuum to about 80 cc. 1.71 g of N-ethyl piperazine are subsequently added and the resulting reaction mixture is heated to the boil at reflux for 4 ½ hours. After the addition of water and a concentrated caustic soda solution, extraction is effected with ether. The organic phase is washed with water and is then exhaustively extracted with 2 N hydrochloric acid. The acid extracts are made alkaline with a concentrated caustic soda solution and the precipitated base is shaken out with ether. The ether phase is washed with water, dried over sodium sulphate and filtered. The filtrate is concentrated by evaporation in a vacuum. The residue is crystallized from petroleum ether, whereby 2-trifluoromethylsulphonyl-11-(4-ethyl-1-piperazinyl)-dibenz[b,f] [1,4]oxazepine is obtained in the form of crystals having a M.P. of 102°–105°.

Example 11: 2-Trifluoromethylsulphonyl-11-(4β-methoxyethyl-1-piperazinyl)-dibenz[b,f] [1,4]oxazepine.

2 g of 2-trifluoromethylsulphonyl-10,11-dihydro-11-oxo-dibenz[b,f] [1,4]oxazepine are heated to the boil at reflux for 4 ½ hours with 25 cc of phosphorus oxychloride and 0.5 cc of N,N-dimethyl aniline. After removing the excess phosphorus oxychloride by distillation in a vacuum, the residue is dissolved in 100 cc of xylene and poured on ice. The xylene phase is washed with 2 N hydrochloric acid and water, dried over sodium sulphate and concentrated in a vacuum to about 80 cc. 2.16 g of N-(β-methoxy-ethyl)-piperazine are subsequently added and the resulting reaction mixture is heated to the boil at reflux for 4 ½ hours. After the addition of water and a concentrated caustic soda solution, extraction is effected with ether. The organic phase is washed with water and is then exhaustively extracted with 2 N hydrochloric acid. The acid extracts are made alkaline with a concentrated caustic soda solution and the precipitated base is shaken out with ether. The ether phase is washed with water, dried over sodium sulphate and filtered. The filtrate is concentrated by evaporation in a vacuum. The residue is crystallized from petroleum ether, whereby 2-trifluoromethylsulphonyl-11-(4β-methoxyethyl-1-piperazinyl)-dibenz[b,f] [1,4]oxazepine is obtained in the form of crystals having a M.P. of 80°–83°.

Example 12: 2-Trifluoromethylsulphonyl-11-(4-methyl-1-piperazinyl)-dibenz[b,f] [1,4]oxazepine.

7.5 g of 2-trifluoromethylsulphonyl-11-amino-dibenz-[b,f] [1,4]oxazepine are stirred at 60° for ½ hour with potassium tert.butylate (from 3 g of potassium) in 40 cc of dimethyl sulphoxide. After the addition of 5.3 g of bis-(β-chloroethyl)-methylamine hydrochloride, 0.9 g of potassium iodide and a further 20 cc of dimethyl sulphoxide, the reaction mixture is stirred at 80° for a further 14 hours. The reaction mixture is subsequently divided between benzene and a large quantity of water. The benzene phase is washed with water and is exhaustively extracted with dilute acetic acid. The acetic acid extracts which have been clarified with charcoal are made alkaline with a concentrated caustic soda solution while cooling with ice and the precipitated base is taken up in chloroform. The chloroform solution is washed with water, dried over sodium sulphate and concentrated by evaporation. The residue is dissolved in benzene and filtered through aluminum oxide. After concentrating and diluting with petroleum ether, crystals are obtained, which are recrystallized from acetone/petroleum ether. 2-Trifluoromethylsulphonyl-11-(4-methyl-1-piperazinyl)-dibenz[b,f] [1,4]oxazepine, having a M.P. of 119°–120°, is obtained, this compound being identical with the product obtained in accordance with Example 5.

The 2-trifluoromethylsulphonyl-11-amino-dibenz[b,f] [1,4]-oxazepine, used as starting material in this Example, is obtained as follows:

10 g of 2-trifluoromethylsulphonyl-10,11-dihydro-11-oxo-dibenz[b,f] [1,4]oxazepine are heated to the boil at reflux for 5 hours with 100 cc of phosphorus oxychloride and 3 cc of N,N-dimethyl aniline. After removing the excess phosphorus oxychloride by distillation in a vacuum, the residue is dissolved in xylene and is shaken out with 2 N hydrochloric acid and water. The organic phase which has been dried over sodium sulphate is strongly concentrated. The residue is heated in a pressure tube to 100° with ammonia for four hours. The reaction mixture is subsequently concentrated by evaporation and the residue is divided between 2 N aqueous sodium hydroxide solution and chloroform. The chloroform phase is clarified with active charcoal, is filtered through aluminum oxide, washed with water, dried over sodium sulphate and concentrated by evaporation. The evaporation residue, consisting of 2-trifluoromethylsulphonyl-11-amino-dibenz-[b,f] [1,4]oxazepine, is used for the reaction mentioned above without further purification.

Example 13: 2-Trifluoromethylsulphonyl-11-(4-methyl-1-piperazinyl)-dibenz[b,f] [1,4]oxazepine.

6.1 g of 2-trifluoromethylsulphonyl-11-amino-dibenz[b,f] [1,4]oxazepine, 1.2 g of ammonium chloride and 25 cc of N-methyl piperazine are heated to 175° in an autoclave for 24 hours. The reaction mixture is subsequently concentrated by evaporation and the residue is taken up in dilute acetic acid, is clarified with active charcoal and filtered. The filtrate is made alkaline with a 2 N aqueous sodium hydroxide solution and is then shaken out with ether. The ether phase is washed with water, dried over sodium sulphate and evaporated to dryness. The residue is crystallized from petroleum ether, whereby 2-trifluoromethylsulphonyl-11-(4-methyl-1-piperazinyl)-dibenz[b,f] [1,4]oxazepine, having a M.P. of 120°–122°, is obtained, this compound being identical with the products obtained in accordance with Examples 5 and 12.

Example 14: 2-Trifluoromethylsulphonyl-11-(4-ethyl-1-piperazinyl)-dibenz[b,f] [1,4]oxazepine.

5.2 g of 2-trifluoromethylsulphonyl-11-(1-piperazinyl)-dibenz[b,f] [1,4]oxazepine (liberated in the usual manner from the maleate obtained in accordance with Example 6) are dissolved in 50 cc of acetone, 1 g of anhydrous potassium carbonate and 2 g of ethyl iodide in 20 cc of acetone are added, and the mixture is heated to the boil at reflux while stirring for 3 hours. The reaction mixture is subsequently concentrated by evaporation in a vacuum. The residue is divided between a 2 N aqueous sodium hydroxide solution and ether, and the ether extracts are washed with water and are exhaustively extracted with 2 N hydrochloric acid. The acid extracts are made alkaline with a concentrated caustic soda solution and are shaken out with chloroform. The chloroform extracts are washed with water, dried over sodium sulphate and evaporated to dryness in a vacuum. The residue is crystallized from petroleum ether, whereby 2-trifluoromethylsulphonyl-11-(4-ethyl-1-piperazinyl)-dibenz[b,f] [1,4]oxazepine, having a M.P. of 102°–105°, is obtained, this compound being identical with the product obtained in accordance with Example 10.

Example 15: 2-Trifluoromethylsulphonyl-11-(4-methyl-1-piperazinyl)-dibenz[b,f] [1,4]oxazepine.

5 g of 2-trifluoromethylsulphonyl-11-(1-piperazinyl)-dibenz[b,f] [1,4]oxazepine are heated to a gentle boil at reflux for 15 hours with 15 cc of 90 percent formic acid and 10 cc of 38 percent formaldehyde. The reaction mixture is subsequently evaporated to dryness and the residue is taken up in water. The reaction mixture is made alkaline with a concentrated caustic soda solution and is then shaken out with ether. The ether phase is clarified with active charcoal, is washed with water, dried over sodium sulphate and concentrated by evaporation. The residue is crystallized from ether/petroleum ether, whereby 2-trifluoromethylsulphonyl-11-(4-methyl-1-piperazinyl)-dibenz[b,f] [1,4]oxazepine, having a M.P. of 119°–120°, is obtained, this compound being identical with the products obtained in accordance with Examples 5, 12 and 13.

Example 16: 2-Trifluoromethylsulphonyl-11-(4γ-hydroxypropyl-1-piperazinyl)-dibenz[b,f] [1,4]oxazepine.

4 g of potassium carbonate and 0.8 g of 3-chloro propanol in 80 cc of acetone are added to 3.4 g of 2-trifluoromethylsulphonyl-11-(1-piperazinyl)-dibenz[b,f] [1,4]oxazepine, and the mixture is heated to the boil at reflux for 4 hours. The reaction mixture is evaporated to dryness in a vacuum, water and a concentrated caustic soda solution are added to the residue and this is exhaustively extracted with ether. The ether phases are washed with water, dried over sodium sulphate, clarified with active charcoal and concentrated by evaporation. After the addition of petroleum ether, crystals are obtained, which are filtered off and recrystallized from acetone/petroleum ether. 2-Trifluoromethylsulphonyl-11-(4γ-hydroxypropyl-1-piperazinyl)-dibenz[b,f] [1,4]oxazepine, having a M.P. of 147°–149°, is obtained, this compound being identical with the product obtained in accordance with Example 8.

Example 17: 2-Trifluoromethylsulphonyl-11-(4β-hydroxyethyl-1-piperazinyl)-dibenz[b,f] [1,4]oxazepine.

8.23 g of 2-trifluoromethylsulphonyl-11-(1-piperazinyl)-dibenz[b,f] [1,4]oxazepine are heated to 100° in a pressure tube for 5 hours with 0.9 g of liquid ethylene oxide and 15 cc of toluene. The content of the tube is subsequently flushed out with acetone and is evaporated to dryness in a vacuum. The residue is taken up in dilute acetic acid, is clarified with active charcoal and filtered. The filtrate is made alkaline with a 2 N aqueous sodium hydroxide solution and is shaken out with ether. The ether phase is washed with water, dried over sodium sulphate and evaporated to dryness. The residue is crystallized from ether/petroleum ether, whereby 2-trifluoromethylsulphonyl-11-(4β-hydroxyethyl-1-piperazinyl)-dibenz[b,f] [1,4]oxazepine, having a M.P. of 120°–122°, is obtained, this compound being identical with the product obtained in accordance with Example 7.

Example 18: 2-Trifluoromethylsulphonyl-11-(4β-methoxyethyl-1-piperazinyl)-dibenz[b,f] [1,4]oxazepine.

6 g of 2-trifluoromethylsulphonyl-11-(1-piperazinyl)-dibenz[b,f] [1,4]oxazepine are dissolved in 100 cc of isopropanol and 1.6 g of anhydrous potassium carbonate are added, whereupon 3 g of β-methoxyethyl-p-toluenesulphonic acid ester in 10 cc of isopropanol are added dropwise while stirring and heating. After the addition is complete, the mixture is heated to the boil at reflux for 1 ½ hours. The reaction mixture is subsequently concentrated by evaporation in a vacuum. The residue is divided between a 2 N aqueous sodium hydroxide solutions and ether, and the ether extracts are exhaustively shaken out with 2 N hydrochloric acid. The acid extracts are made alkaline with a concentrated caustic soda solution and are shaken out with ether. The ether extracts are washed with water, dried over sodium sulphate and concentrated by evaporation in a vacuum. After the addition of petroleum ether, crystals are obtained, which are filtered off and recrystallized from ether/petroleum ether. 2-Trifluoromethylsulphonyl-11-(4β-methoxyethyl-1-piperazinyl)-dibenz[b,f] [1,4]oxazepine, having a M.P. of 80°–82°, is obtained, this compound being identical with the product obtained in accordance with Example 11.

Example 19: 2-Trifluoromethylsulphonyl-11-(4β-acetoxyethyl-1-piperazinyl)-dibenz[b,f] [1,4]oxazepine.

2 g of 2-trifluoromethylsulphonyl-11-(4β-hydroxyethyl-1-piperazinyl)-dibenz[b,f] [1,4]oxazepine are dissolved in 20 cc of absolute pyridine, 5 cc of acetic anhydride are added to the solution and this is allowed to stand for 24 hours. The reaction mixture is subsequently strongly concentrated by evaporation in a vacuum and the residue is distilled off with absolute xylene. After the addition of water, the reaction mixture is made alkaline with a 2 N aqueous sodium hydroxide solution and shaking out is effected with ether. The ether phase is washed with water and with an aqueous sodium chloride solution, is dried over sodium sulphate and concentrated by evaporation. 2-Trifluoromethylsulphonyl-11-(4β-acetoxyethyl-1-piperazinyl)-dibenz[b,f] [1,4]oxazepine is obtained as residue in the form of a viscous, yellow oil.

What is claimed is:
1. A compound of the formula:

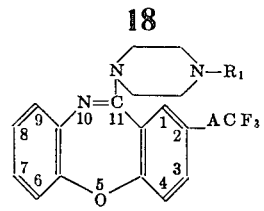

wherein A is sulphur or a sulphonyl group, $R_1$ is hydrogen, alkyl of one to three carbon atoms, hydroxyalkyl of one to three carbon atoms, acetoxy-alkyl, wherein the alkyl is of one to three carbon atoms, or alkoxyalkyl with a total of at most six carbon atoms, or a pharmaceutically acceptable acid addition salt thereof.

2. The compound of claim 1, which is 2-trifluoromethylthio-11-(4-methyl-1-piperazinyl)-dibenz[b,f] [1,4]oxazepine.

3. The compound of claim 1, which is 2-trifluoromethylthio-11-(4β-hydroxyethyl-1-piperazinyl)-dibenz[b,f] [1,4]oxazepine.

4. The compound of claim 1, which is 2-trifluoromethylthio-11-(1-piperazinyl)-dibenz[b,f] [1,4]oxazepine.

5. A compound of the formula:

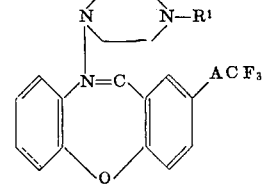

wherein A is a sulphonyl group and $R^1$ is hydrogen, alkyl of one to three carbon atoms, hydroxy alkyl of one to three carbon atoms, acetoxy alkyl, wherein the alkyl is of one to three carbon atoms, or alkoxy alkyl with a total of at most six carbon atoms, or a pharmaceutically acceptable acid addition salt thereof.

6. The compound of claim 5, which is 2-trifluoromethylsulphonyl-11-(1-piperazinyl)-dibenz[b,f] [1,4]oxazepine.

7. The compound of claim 5, which is 2-trifluoromethylsulphonyl-11-(4β-hydroxyethyl-1-piperazinyl)-dibenz[b,f] [1,4]oxazepine.

8. The compound of claim 5, which is 2-trifluoromethylsulphonyl-11-(4γ-hydroxypropyl-1-piperazinyl)-dibenz[b,f] [1,4]oxazepine.

9. The compound of claim 5, which is 2-trifluoromethylsulphonyl-11-(4β-hydroxypropyl-1-piperazinyl)-dibenz[b,f [1,4]oxa-zepine.

10. The compound of claim 5, which is 2-trifluoromethylsulphonyl-11-(4-ethyl-1-piperazinyl)-dibenz[b,f] [1,4]oxazepine.

11. The compound of claim 5, which is 2-trifluoromethylsulphonyl-11-(4β-methoxyethyl-1-piperazinyl)-dibenz[b,f] [1,4]oxa-zepine.

12. The compound of claim 5, which is 2-trifluoromethylsulphonyl-11-(4β-acetoxyethyl-1-piperazinyl)-dibenz[b,f] [1,4]oxa-zepine.

13. The compound of claim 5, which is 2-trifluoromethylsulphonyl-11-(4-methyl-1-piperazinyl)-dibenz[b,f] [1,4]oxazepine.

* * * * *